Dec. 22, 1959    F. F. BROMAN    2,918,051
PICNIC BARBECUE GRILL
Filed Jan. 4, 1952

INVENTOR.
Francis F. Broman
BY
ATTORNEY

United States Patent Office 2,918,051
Patented Dec. 22, 1959

2,918,051

PICNIC BARBECUE GRILL

Francis F. Broman, Lakewood, Colo.

Application January 4, 1952, Serial No. 264,917

3 Claims. (Cl. 126—25)

The present invention relates to a picnic barbecue grill. It has to do particularly, although not exclusively, with a knock-down portable barbecue grill for use on picnics and other out-of-doors cooking occasions. Moreover, it has to do with a portable picnic grill which employs for the source of heat a solid fuel, such as charcoal in briquet form, although other solid fuels may be used.

One of the important objects of the invention is to provide an inexpensive portable grill or camp stove of relatively simple construction which is capable of quick assembly and of being knocked down or disassembled and stored in a small space, as well as one which is capable of being easily transported.

Another object of the present invention is to provide an improved grill of the foregoing character having means for enlarging or augmenting the radiant heat given off by the solid fuel in the grill to improve its cooking qualities.

A further object of the present invention is to provide an improved grill as aforesaid having a minimum of parts all of which are capable of being made from light weight but durable and inexpensive material, such as scrap or discarded metal.

Another object of the present invention is to provide an improved grill assembly of the foregoing nature which is capable of being quickly and easily set up on a lawn, for example, and in which the heat given off by the solid fuel in the grill will in no way harm the lawn; it being a further object of the invention to provide an improved grill in which the fire basket or fuel-containing member of the grill is capable of being supported at different heights above the ground or other supporting surface upon which it is placed.

The foregoing and other objects and advantages of the present invention will appear from the following description and appended claims when considered in conjunction with the accompanying drawing forming a part of this specification wherein like reference characters designate corresponding parts in the several views.

Figure 1:
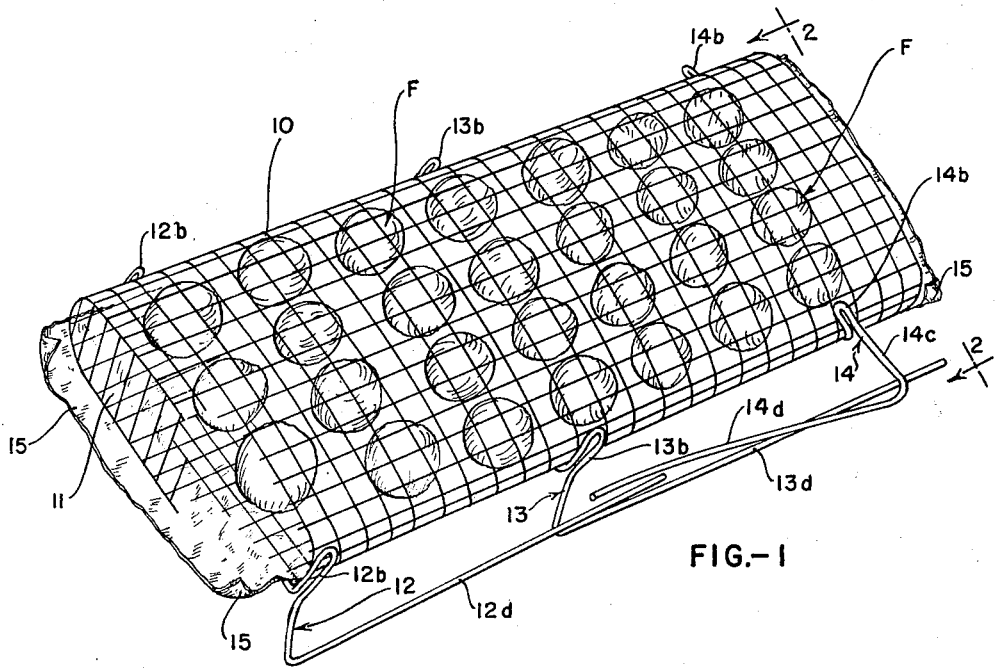
Fig. 1 is a perspective view, partly broken away, illustrating one form of portable picnic barbecue grill embodying the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Various types of camp stoves or picnic barbecue grills have appeared on the market but most of them are structurally such as to require the use of relatively expensive material in their manufacture and thus necessitate a high selling price. Moreover, known camp stoves or picnic grills have been of relatively complicated structure which required considerable pains and consumed considerable time in setting them up and in dismantling them. Other known types of grills have not been of the knock-down variety and have thus required considerable storage space as well as considerable space in transporting them.

With all of the known camp stoves or grills on the market there has not been available a portable knock-down picnic grill, or the like, which could be purchased for a reasonably low sum of money so as to make such an item available to all persons of the poorer class. Furthermore, all known camp stoves, or portable barbecue grills have required special material in their manufacture which has increased the cost of them. In contrast to this situation, it is another and important purpose of the present invention to provide a new and improved portable knock-down picnic barbecue grill or camp stove, the major portion at least of which can be made from discarded scrap, or otherwise waste material. While in the drawing I have illustrated a grill member proper which is shown as being formed from square mesh wire, it is to be understood that various other materials may be employed for this purpose. For example, it is well known that in the mints of the country certain coins are stamped out of sheet metal. The remaining portions of the sheets of metal from which the lower denomination coins are stamped usually become scrap or waste material. Foraminous or punctured sheets of this material may be easily obtained and at extremely low cost and it provides very excellent material for the purpose of producing the grill member proper or hollow solid fuel grid of the type indicated in the accompanying drawing.

With reference now to the drawing, there is shown a hollow grill member or fire basket which is indicated as a whole at 10 in each of the figures. As shown, the hollow elongated grill member 10 is formed from a piece or strip of one-half inch square mesh galvanized wire which is shaped, as shown, to provide a generally oblong grill proper, having an upper grill member 10a and a lower grill member 10b, in transverse cross section. If desired, one end of the grill or foraminous container 10 may be closed, as indicated at 11 in Fig. 1. By so closing one end, the solid fuel which is placed within the grill for the purposes of making the fire, may be allowed to remain in the grill when it is being transported or during storage, the grill or grid member serving as a container or basket for the unburned fuel.

It is, of course, desirable to support the grill 10 upon but above the ground or lawn surface, or above any other desirable, or suitable, or convenient supporting surface, so as to leave a space for the circulation of air below the grill. This space also serves to prevent damage from heat to the grass, for example, beneath the portable grill.

Figure 2:
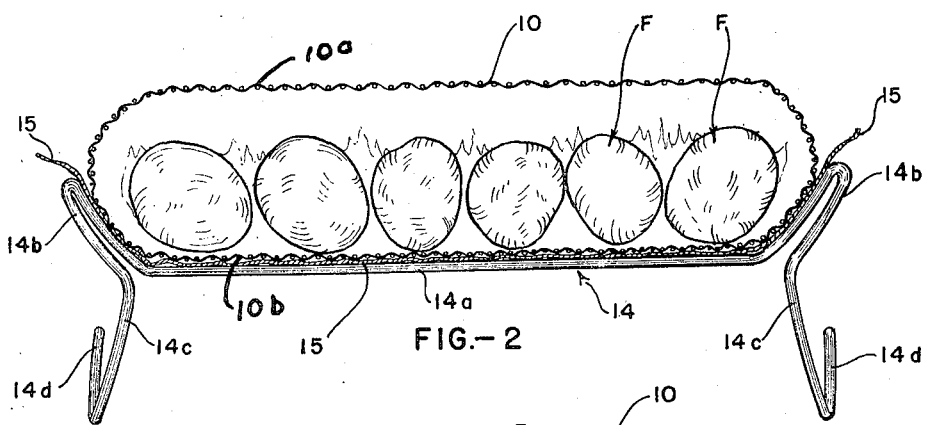
Fig. 2 is en enlarged end elevational view taken subsequently along the line 2—2 of Fig. 1, looking in the direction of the arrows.

As shown in Figs. 1 and 2, a plurality, namely three, as shown, wicket-like wire leg members 12, 13 and 14 are employed. With reference to Fig. 2 of the drawing, the wicket-like member 14 is substantially the same as the wicket-like members 12 and 13 and comprises, as shown, a substantially horizontal grill or basket supporting portion 14a having its ends in the form of open loops 14b and terminating in generally right angularly disposed portions 14c and 14d. The portions 14d of the wicket-like member 14 provide the actual legs of the member and when it is desirable to support the grill member 10 relatively close to the ground or other supporting surface, three or more of the wickets, such as the members 12, 13 and 14, are spaced at generally equi-distant points with the leg portions thereof, namely the portions 14d of wicket-like member 14 and the corresponding portions 12d and 13d of wicket-like members 12 and 13 resting flat on the ground or other supporting surface, as clearly seen in Fig. 1. It is to be noted that in both Figs. 1 and 2, the open loop portions 14b, 13b and 12b of the wicket-like members 14, 13 and 12, respectively, serve to embrace the outer side edges or surfaces of the grill member 10 so as to support said hollow foraminous member firmly in place. Since the grill 10 and the open loop portions of the supporting members or wicket-like supports have an inherent amount of give or springiness when pressure is applied to them, it will be understood that the upper end portions of the wicket-like members will frictionally engage and thus embrace the grill proper 10. In addition, the shape of the upper portions of the wickets and the length of the leg portions thereof 12d, 13d and 14d together function to maintain the long portions flat upon the ground.

It will be noted in Fig. 1 that whereas the leg portions 12d and 13d extend toward the right in this figure, the leg portions 14d of member 14 extend toward the left, or in the opposite direction. This is simply a matter of choice for the person setting up the picnic barbecue grill assembly and thus maintains the leg portions of all of the supporting members beneath or in the vicinity of the grill area. There is, of course, no reason why the grill-supporting members could not all extend in the same direction.

Figure 3:
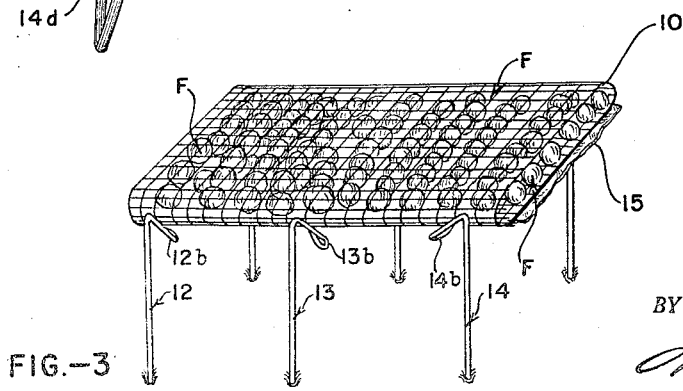
Fig. 3 is a perspective view showing a somewhat different manner of employing the supporting means for the grill to space the grill member further above the ground or other supporting surface.

One of the more important features of the present picnic barbecue grill resides in the means for enlarging or augmenting the radiant heat given off by the solid fuel within the grill 10. Such means, as shown in Figs. 1, 2 and 3, comprises a strip or sheet of metal foil, preferably aluminum foil, shown at 15 in each of these figures, held against the lower grill member 10b by fastening means arranged along the grill edges. The metal foil 15 is easily obtainable in rolls or sheet form and after its use in connection with the present picnic barbecue grill, may be rolled up or folded so as to require little storage space.

The bright-surfaced sheet or strip of foil or similar heat and light-reflecting material 15 is preferably approximately the same length and width as the length and width of the basket-like grill member 10. After the wicket-like grill-supporting members 12, 13 and 14 have been placed upon the ground or other supporting surface, the strip or length of metal foil 15 is spread across these members, whereupon the basket-like grill member 10 is laid in place over the foil sheet and the horizontal supporting portions of the leg members 12, 13 and 14. As shown, the leg members have portions providing the fastening means along the grill edges. The weight of the grill proper 10 will, of course, maintain the sheet of metal foil in substantially flatwise or horizontal condition and the sheet will thus form insulation between the basket-like grill 10 (enclosing the burning fuel) and a supporting surface, such as a lawn upon which the grill has been set up.

The bright foil sheet 15 performs two important functions. It serves primarily as a heat reflecting member for the purpose of enlarging or augmenting the radiant heat which is given off by the solid fuel in the basket-like grill 10 and it also serves to prevent droppings from the grill which might damage the lawn or other supporting surface on which the grill is located. It has been found in actual practice that the intensity of the heat created by solid fuel, such as the charcoal briquettes F seen in each of Figs. 1, 2 and 3, is greatly intensified and thus provides a faster and more efficient camp stove on which food may be cooked.

It is to be understood that after the charcoal briquettes F have been ignited and the fire is properly under way, the meat or other food to be grilled or cooked, is laid directly on the top surface of the wire-formed basket-like grill member 10. Since the meat, or other article of food is located directly above the glowing charcoal briquettes F, the cooking of the meat is naturally more efficient and rapid than with other types of camp stoves or portable grills. During this cooking operation and as mentioned above, the bright reflecting foil sheet 15 not only serves to enlarge or augment the radiant heat to which the food is subjected, but provides protection against coals falling onto the lawn or other supporting surface, as well as protecting in the same manner against any meat drippings which might otherwise find their way onto said lawn and damage it. In addition to cooking directly on the grill basket surface, as stated above, it is to be understood that food may, of course, be cooked in utensils which are placed directly on the basket-like grill top surface.

After the cooking operation has been completed the fire is allowed to die down or, if desired, the basket-like grill member 10 may be picked up and submerged in water to quench the coals of fire; or the hot coals may be discharged through the open end of grill 10 and smothered in any other suitable manner and the fuel thus preserved for future use. To transport the grill after use, it is then merely necessary to remove the sheet of foil 15 from its position upon the wickets and place the sheet and the wickets, together with the basket 10 in the rear deck of the automobile, or in some suitable carton or other container provided for the purpose. If desirable, the remaining charcoal briquettes may be removed from the basket 10 and placed in a suitable container for use at a later time or, if desired, they may be allowed to remain in storage in the basket and thus be in readiness for use on the next occasion. Moreover, since the foil 15 is expendable, it may be discarded and new foil used for the next cooking operation.

With particular reference now to Fig. 3 of the drawing, the grill structure or assembly shown in this figure is substantially the same as that of Figs. 1 and 2, the difference residing in the fact that the basket-like grill or combined fuel container and grid 10 is supported at a greater distance above the ground than in Fig. 1. In setting up the grill assembly of Fig. 3 the wicket members 12, 13 and 14 have their lower ends or leg portions preferably pushed into the ground to support them in substantially vertical positions as shown. Also, as shown, the open loop portions 12a and 13a of wickets 12 and 13 are directed toward the right in Fig. 3, whereas the corresponding open loop portions 14a of wicket 14 are directed or pointed in the opposite direction. Again, this is a matter of choice for the person setting up the grill assembly.

After the wickets 12, 13 and 14 of Fig. 3 have been positioned as shown, a sheet or strip of metal foil 15 is placed over the wickets in overlying relationship to them. Thereafter, the elongated basket or foraminous grill member 10 is placed in position upon the horizontally extending portions (not shown) of the legs or wicket-like members 12, 13 and 14. The weight of the basket-like grill 10 will serve to maintain the sheet 15 of the foil in substantially horizontal operation, the sheet or strip of foil 15 of Fig. 3 is generally of the same or greater length and width as the length of the basket 10. When of greater dimensions than that of the basket 10, the folding up of the foil so as to enclose portions of the side walls of the basket-like container, as seen in Fig. 2, functions to prevent undesired effects from wind and drafts. It is also usually formed from aluminum and has a bright heat reflecting surface which serves to enlarge or augment the radiant heat effect of the solid fuel, namely the charcoal briquettes F of Fig. 3. In the same manner as in the preceding form, the sheet of foil 15 also provides protection against hot coals falling onto the lawn or other supporting surface beneath or adjacent to the grill assembly. In addition, the aluminum foil 15 protects in the same way against the possibility of meat drippings which might find their way onto the lawn or other supporting surface.

It is to be understood, of course, that is is desirable, regardless of the type of solid fuel employed, to space the particles of fuel so that there can be a free circulation of air and products of combustion between them.

Moreover, it is to be understood that whereas I have mentioned the use of metal foil, such as aluminum foil, a suitable sheet or strip of bright-surface metal may be employed instead of the metal foil. If a sheet of relatively stiff though thin and light weight bright-surface metal is employed, it should be of a size generally comparable to the length and width of the basket-like grill member of foraminous solid fuel container 10.

It should be noted that one of the more important advantages derived from the portable knock-down picnic barbecue grill of the present invention is the location of the perforated or foraminous container 10 for the charcoal, or other solid fuel, above and in close proximity to the sheet or strip metal foil or other radiant heat reflector 15. This arrangement permits the free circulation of air about all surfaces of the contained charcoal F and produces a high heat effect from the radiant action above described. The said arrangement minimizes the necessity of setting up the grill in wind protected areas, because of a greater reliance upon the transfer of heat by radiation and less reliance upon the transfer of heat by convection and conduction.

Having thus described my invention what is claimed is:

1. A cooking device for employing solid fuel comprising an enclosure having upper and lower grill members spaced to contain a single tier of fuel briquettes, the top surfaces of which are closely adjacent said upper member, whereby material seated on said upper member may be heated by the fuel in said enclosure, a sheet of reflective metal mounted against the under surface of said lower member in closely spaced, superposed relation whereby passage of air through said lower member is minimized and heat from the fuel contained between said members is conserved by reflection from said metal sheet and is directed against said upper member, and fastening means along the edges of said lower member for maintaining said metal sheet in close adjacency to said fuel, said enclosure having open ends and closed sides.

2. A cooking device according to claim 1 in which the supporting legs are coextensive with said fastening means arranged to maintain the metal sheet in close adjacency to said fuel.

3. A cooking device according to claim 1 in which the supporting legs are coextensive with said fastening means and includes lateral members extending from a leg on one side to a leg on the other side for holding said metal sheet in close adjacency to said fuel.

References Cited in the file of this patent

UNITED STATES PATENTS

| | | |
|---|---|---|
| 44,175 | Foote | Sept. 13, 1864 |
| 2,152,168 | Anderson et al. | Mar. 28, 1936 |
| 2,048,769 | Anderson | July 28, 1936 |
| 2,158,805 | Smith | May 16, 1939 |
| 2,236,992 | Broadley | Apr. 1, 1941 |
| 2,247,612 | Haislip | July 1, 1941 |
| 2,466,859 | Northup | Apr. 12, 1949 |
| 2,580,925 | Jarvis | Jan. 1, 1952 |
| 2,597,477 | Haislip | May 20, 1952 |